United States Patent [19]

Nakajima et al.

[11] Patent Number: 5,211,151
[45] Date of Patent: May 18, 1993

[54] APPARATUS FOR RESTRICTING DISCHARGE OF EVAPORATED FUEL GAS

[75] Inventors: Takeaki Nakajima; Hideo Watanabe, both of Utsunomiya, Japan

[73] Assignee: Honda Giken Kogyo Kabushiki Kaisha (Honda Motor Co., Ltd.), Tokyo, Japan

[21] Appl. No.: 835,887

[22] Filed: Feb. 14, 1992

[30] Foreign Application Priority Data

Feb. 27, 1991 [JP] Japan .................................. 3-9649

[51] Int. Cl.⁵ .............................................. F02M 33/02
[52] U.S. Cl. ...................................... 123/520; 123/516
[58] Field of Search ............... 123/518, 519, 520, 521, 123/516

[56] References Cited

U.S. PATENT DOCUMENTS

| | | | |
|---|---|---|---|
| 3,575,152 | 4/1971 | Wentworth | 123/520 |
| 3,935,850 | 2/1976 | King | 123/520 |
| 4,343,281 | 8/1982 | Uozumi | 123/520 |
| 4,815,436 | 3/1989 | Sasaki et al. | 123/520 |
| 4,836,172 | 6/1989 | Haruta | 123/521 |
| 4,872,439 | 10/1989 | Sonoda et al. | 123/518 |
| 5,027,780 | 7/1991 | Uranishi | 123/520 |
| 5,067,468 | 11/1991 | Otowa | 123/520 |
| 5,085,194 | 2/1992 | Koroda | 123/520 |
| 5,117,797 | 6/1992 | Telep | 123/520 |

Primary Examiner—Carl S. Miller
Attorney, Agent, or Firm—Armstrong, Westerman, Hattori, McLeland & Naughton

[57] ABSTRACT

A fuel tank to be mounted on a vehicle and a canister are connected together via a two-way valve and a solenoid valve. Both valves are disposed within a valve casing which has a pair of connecting ports for connection to the fuel tank and to the canister, respectively. A bypass passage, which bypasses the two-way valve, to bring the two connecting ports into fluid communication with each other is provided inside the valve casing, and a solenoid valve is interposed in the bypass passage.

9 Claims, 1 Drawing Sheet

APPARATUS FOR RESTRICTING DISCHARGE OF EVAPORATED FUEL GAS

BACKGROUND OF THE INVENTION

This invention relates to an apparatus for restricting discharge of evaporated fuel gas, the apparatus having such a construction that gas evaporated in a fuel tank to be mounted on a vehicle is introduced into a canister for adsorbing the gas therein.

As a conventional apparatus of this kind, there is known an apparatus, as shown in FIG. 4, in which a fuel tank a and a canister b are connected together via a two-way valve c. The two-way valve c operates to open when the internal pressure in the fuel tank a has reached a predetermined positive set pressure, whereby the evaporated gas inside the fuel tank a is introduced into the canister c, and operates to open when the internal pressure in the fuel tank a has lowered to a predetermined negative pressure, whereby the evaporated gas kept stored in the canister c is returned to the fuel tank a.

The evaporated gas inside the fuel tank a is not introduced into the canister c until the pressure of the evaporated gas has increased to the positive set pressure. It follows that there is a possibility that the evaporated gas is discharged into atmosphere at the time of filling the fuel tank with a fuel, or the like. As one way of coping with this possibility, it is considered to connect, in parallel with the two-way valve c, a solenoid valve d which opens at the time of opening a filler lid of the fuel tank or the like. In this arrangement, even if the internal pressure in the fuel tank is below the set pressure, the evaporated gas can be introduced into the canister b through the solenoid valve d, thereby preventing the evaporated gas from being discharged into atmosphere.

In case the solenoid valve d is provided as described above, the arrangement will be that three-way joints e are provided on both sides of the two-way valve c so that the solenoid valve d is connected in parallel with the two-way valve c via tubes f between both joints e. In this arrangement, however, the piping work in the step of vehicle assembling work becomes troublesome. Further, the number of piping connections increases with a consequent increased possibility of leaks of the evaporated gas from these piping connections. There is also required a large space for disposing the two valves, resulting in a poor space-efficiency.

OBJECT AND SUMMARY OF THE INVENTION

In view of the above disadvantages, this invention has an object of providing an apparatus in which the two-way valve and the solenoid valve can be arranged for connection between the fuel tank and the canister in a simpler piping construction and a better space-efficiency.

For achieving the above object, this invention is an apparatus for restricting discharge of evaporated fuel gas, the apparatus having a fuel tank to be mounted on a vehicle and a canister which are connected together via a two-way valve and a solenoid valve, the solenoid valve being disposed in parallel with the two-way valve, wherein: a valve casing having a pair of connecting ports for connection to the fuel tank and the canister, respectively, is provided; the two-way valve is contained in the valve casing; a bypass passage which bypasses the two-way valve to bring the pair of connecting ports into fluid communication with each other is provided inside said valve casing; and the solenoid valve is interposed in the bypass passage.

Since the solenoid valve is interposed in the bypass passage inside the valve casing in which the two-way valve is contained, the two-way valve and the solenoid valve are both disposed within the same casing. Therefore, both valves can be arranged together in a compact manner in close relationship with each other.

If one of the connecting ports is connected to the fuel tank and the other of the connecting ports is connected to the canister, the evaporated gas is caused to flow between the fuel tank and the canister via the two-way valve within the casing, like in the conventional manner, in a direction depending on the internal pressure in the fuel tank. On the other hand, when the solenoid valve is opened, the fuel tank and the canister are brought into fluid communication with each other via the bypass passage.

BRIEF DESCRIPTION OF THE DRAWINGS

The above and other objects and the attendant advantages of this invention will become readily apparent by reference to the following detailed description when considered in conjunction with the accompanying drawings wherein.

DETAILED DESCRIPTION OF A PREFERRED EMBODIMENT

Figure 1:
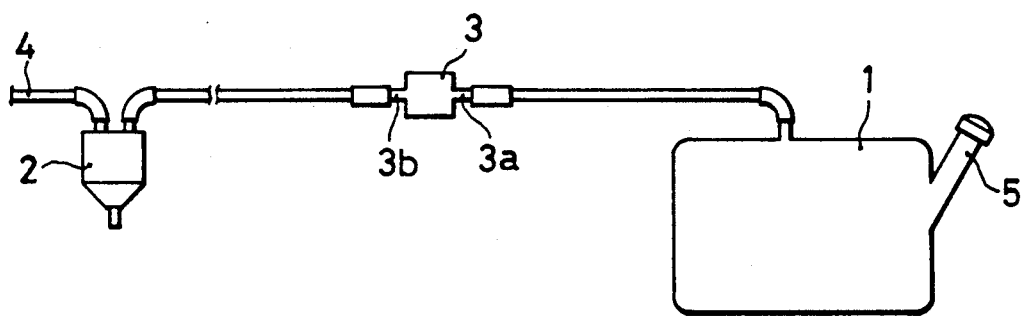
FIG. 1 is a system diagram of an embodiment of an apparatus of this invention.

Referring to FIG. 1, numeral 1 denotes a fuel tank to be mounted on a vehicle and numeral 2 denotes a canister. Between this fuel tank 1 and the canister 2, there is disposed a valve casing 3 having a first connecting port 3a which is connected by piping to the fuel tank 1 and a second connecting port 3b which is connected by piping to the canister 2. In FIG. 1, numeral 4 denotes a vent passage for guiding evaporated gas from the canister 2 to an engine and numeral 5 denotes a filling port for filling the fuel tank 1 with a fuel.

Figure 2:
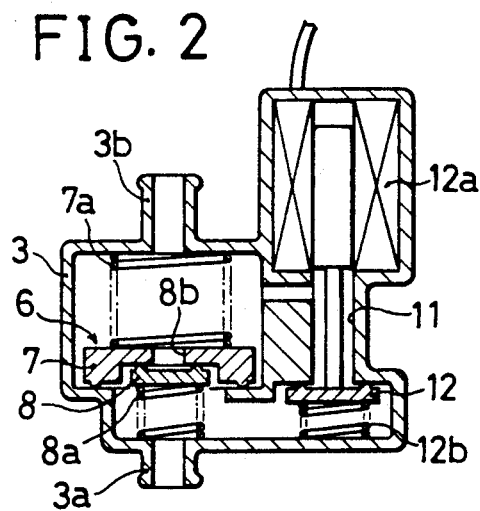
FIG. 2 is a sectional view of a first embodiment of a valve casing.

Inside the valve casing 3 there is contained, as shown in FIG. 2, a two-way valve 6 which is constituted by a positive-pressure valve 7 which opens against a spring 7a when that internal pressure in the fuel tank 1 which acts on the positive-pressure valve 7 through the first connecting port 3a has increased to a predetermined positive set pressure, and a negative-pressure valve 8 which opens against a spring 8a when the internal pressure in the fuel tank 1 has lowered to a predetermined negative set pressure. It is thus so arranged that, when the positive-pressure valve 7 is opened, the evaporated gas from the fuel tank 1 flows from the first connecting port 3a to the second connecting port 3b and that, when the negative-pressure valve 8 is opened, the evaporated gas from the canister 3 flows from the second connecting port 3b to the first connecting port 3a.

Figure 3:
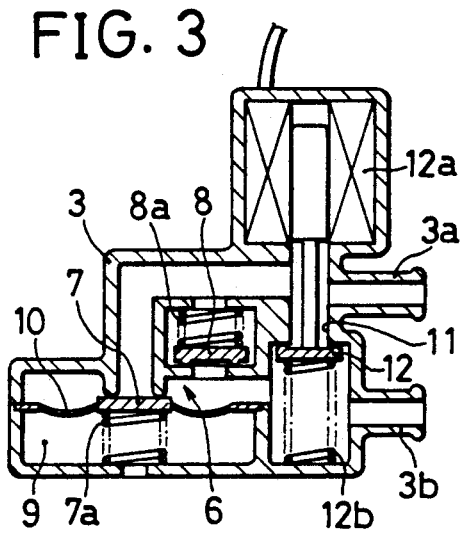
FIG. 3 is a sectional view of a second embodiment of the valve casing.
Figure 4:
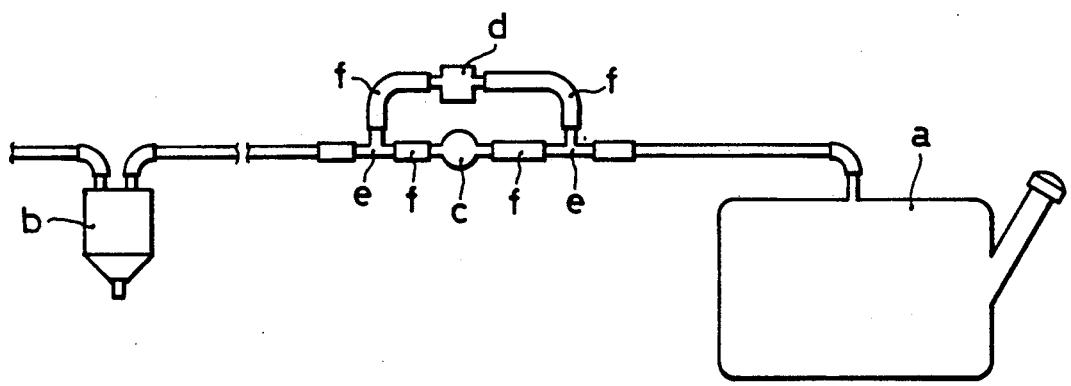
FIG. 4 is a system diagram of a conventional example.

In the embodiment shown in FIG. 2, the negative-pressure valve 8 is provided in combination with the positive-pressure valve 7 so as to open or close a valve opening 8b which is formed in the positive-pressure valve 7. However, another embodiment may be employed, as shown in FIG. 3, so that the positive-pressure valve 7 is disposed separately from the negative-pressure valve 8. In the embodiment shown in FIG. 3, the positive-pressure valve 7 is mounted on a corrugated or slackened sealing membrane 10 for partitioning an atmospheric chamber 9 which is formed in the valve casing 3. The positive-pressure valve 7 is urged towards the closing direction by a spring 7a inside the atmospheric chamber 9 so that the positive-pressure valve 7 can be opened at a predetermined set pressure based on the atmospheric pressure, without being subjected to the influence of pressure variations on the side of the canister 2.

In either of the above-mentioned embodiments, a bypass passage 11 is formed inside the valve casing 3 such that the bypass passage 11 bypasses the two-way valve 6 for bringing the connecting ports 3a, 3b into fluid communication with each other. A solenoid valve 12 is disposed inside the valve casing 3 so as to be interposed in the bypass passage 11. A solenoid 12a of this solenoid valve 12 operates to be energized in interlocking with such operations as to release the locking of a filler lid which is provided in an opening for inserting a filling nozzle on an outside of the vehicle, or to switch off an ignition key of the vehicle, or the like. The solenoid valve 12 is arranged, through energization of the solenoid 12a, to be opened against a spring 12b. When the solenoid valve 12 is thus opened, even if the internal pressure in the fuel tank 1 has not reached the setting pressure at which the positive-pressure valve 7 is opened, the connecting ports 3a, 3b are brought into fluid communication with each other by the bypass passage 11. Consequently, the evaporated gas is introduced into the canister 2 and, therefore, the evaporated gas can be prevented from being discharged into atmosphere at the time of filling the fuel tank with the fuel, or the like.

As is apparent from the above description, according to this invention, the two-way valve and the solenoid valve, which is arranged in parallel with the two-way valve, are incorporated into the common valve casing. Therefore, the two valves can be arranged together in a better space-efficiency, and the piping to the respective valves can be eliminated. There is another advantage in that, due to a smaller number of piping connections, the leaking of the evaporated gas through the piping connections can be restricted.

It is readily apparent that the above-described apparatus for restricting discharge of evaporated fuel gas has the advantages of wide commercial utility. It should be understood that the specific form of the invention hereinabove described is intended to be representative only, as certain modifications within the scope of these teachings will be apparent to those skilled in the art.

Accordingly, reference should be made to the following claims in determining the full scope of the invention.

What is claimed is:

1. Apparatus for restricting discharge of evaporated fuel gas from a fuel tank comprising:
   a fuel tank;
   a canister;
   fluid conduit means connecting said fuel tank to said canister;
   a valve casing disposed in said fluid conduit means, said valve casing having a pair of connecting ports for connection to said fluid conduit means leading to said fuel tank and said fluid conduit means leading to said canister, respectively;
   a first fluid passage between said connecting ports internally of said valve casing;
   a two-way valve in said first fluid passage, said two-way valve comprising a positive-pressure valve and a negative-pressure valve combined into a unitary arrangement in a manner complementary to each other such that when one of the positive-pressure and negative-pressure valves opens, the other closes;
   a second fluid passage between said connecting ports internally of said valve casing, said second fluid passage by-passing said two-way valve in said first fluid passage, and
   a solenoid valve in said second fluid passage.

2. Apparatus for restricting discharge of evaporated fuel gas from a fuel tank comprising:
   a fuel tank;
   a canister;
   fluid conduit means connecting said fuel tank to said canister;
   a valve casing disposed in said fluid conduit means, said valve casing having a first connecting port for connection to said fluid conduit means leading to said fuel tank and a second connecting port for connection to said fluid conduit means leading to said canister;
   a two-way valve provided internally of said valve casing;
   a first fluid passage internally of said valve casing and leading from said first connecting port to said two-way valve;
   a second fluid passage internally of said valve casing and leading from said second connecting port to said two-way valve;
   a third fluid passage providing fluid communication between said first and second fluid passages internally of said valve casing, said third fluid passage bypassing said two-way valve;
   said two-way valve being located more distant from said first and second connecting ports than said third passage; and
   a solenoid valve in said third fluid passage.

3. Apparatus for restricting discharge of evaporated fuel gas from a fuel tank comprising:
   a fuel tank;
   a canister;
   fluid conduit means connecting said fuel tank to said canister;
   a valve casing disposed in said fluid conduit means, said valve casing having a first connecting port for connection to said fluid conduit means leading to said fuel tank and a second connecting port for connection to said fluid conduit means leading to said canister;
   a first fluid passage between said connecting ports internally of said valve casing;
   a two-way valve in said first fluid passage;
   a second fluid passage between said first and second connecting ports internally of said valve casing, said second fluid passage by-passing said two-way valve in said first fluid passage;
   a solenoid valve in said second fluid passage;
   said solenoid valve having a valve member movable to a position closing said second fluid passage;
   means on one side of said valve member biasing said valve member to said closed position; and
   said first connecting port providing fluid pressure to said second fluid passage on a side of said valve member opposite from said biasing means; whereby said fluid pressure assists in opening said valve member against said biasing means.

4. An apparatus according to claim 1, wherein said fuel tank is mounted on a vehicle, said vehicle includes a lockable filler lid for said fuel tank and said solenoid valve is opened in response to releasing the locking of said filler lid.

5. An apparatus according to claim 1, wherein said fuel tank is mounted on a vehicle operable in response to turning an ignition switch on and said solenoid valve is opened in response to said ignition switch being switched off.

6. An apparatus according to claim 2, wherein said fuel tank is mounted on a vehicle, said vehicle includes a lockable filler lid for said fuel tank and said solenoid valve is opened in response to releasing the locking of said filler lid.

7. An apparatus according to claim 2, wherein said fuel tank is mounted on a vehicle operable in response to turning an ignition switch on and said solenoid valve is opened in response to said ignition switch being switched off.

8. An apparatus according to claim 3, wherein said fuel tank is mounted on a vehicle, said vehicle includes a lockable filler lid for said fuel tank and said solenoid valve is opened in response to releasing the locking of said filler lid.

9. An apparatus according to claim 3, wherein said fuel tank is mounted on a vehicle operable in response to turning an ignition switch on and said solenoid valve is opened in response to said ignition switch being switched off.

* * * * *